United States Patent
Tseng et al.

(10) Patent No.: US 8,565,299 B2
(45) Date of Patent: Oct. 22, 2013

(54) METHOD AND APPARATUS FOR PROCESSING AUDIO/VIDEO BIT-STREAM

(75) Inventors: Yi-Chen Tseng, Yilan County (TW); Cheng-Ying Yu, Chiayi (TW); Chao-An Hsieh, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 506 days.

(21) Appl. No.: 12/392,106

(22) Filed: Feb. 25, 2009

(65) Prior Publication Data

US 2009/0228601 A1 Sep. 10, 2009

(30) Foreign Application Priority Data

Mar. 6, 2008 (TW) .............................. 97107871 A

(51) Int. Cl.
*G06F 15/16* (2006.01)
(52) U.S. Cl.
USPC ............ 375/240.01; 375/240.25; 375/240.26; 386/326; 386/330; 386/332; 386/334
(58) Field of Classification Search
USPC .................................. 386/326, 330, 332, 334
See application file for complete search history.

(56) References Cited

U.S. PATENT DOCUMENTS

| | | | |
|---|---|---|---|
| 5,491,513 A | 2/1996 | Wickstrom | |
| 5,903,282 A | 5/1999 | Schoner | |
| 6,459,738 B1 | 10/2002 | Wu | |
| 2004/0030665 A1 | 2/2004 | Sullivan | |
| 2005/0007263 A1* | 1/2005 | Zhou | 341/55 |
| 2006/0036759 A1* | 2/2006 | Shen et al. | 709/234 |
| 2008/0253405 A1* | 10/2008 | Ng et al. | 370/506 |
| 2008/0304757 A1* | 12/2008 | Chen et al. | 382/232 |

\* cited by examiner

*Primary Examiner* — Daquan Zhao
*Assistant Examiner* — Sunghyoun Park
(74) *Attorney, Agent, or Firm* — McClure, Qualey & Rodack, LLP

(57) ABSTRACT

A method for processing an audio/video bit-stream includes the steps of receiving an input bit-stream, detecting whether the input bit-stream has a startcode emulation prevention pattern, and removing the startcode emulation prevention pattern from the input bit-stream to generate an output bit-stream and setting a flag signal as a first designated flag value when the startcode emulation prevention pattern is detected. The method further includes the step of detecting whether the input bit-stream includes a startcode, and directly outputting the input bit-stream and setting the flag signal as a second designated flag value when the startcode is detected.

16 Claims, 5 Drawing Sheets

| Input Bit-Stream | 00_00_03_00<br>00_00_03_01<br>00_00_03_02<br>00_00_03_03 | 00_00_01 | Others |
|---|---|---|---|
| Output Bit-Stream | 00_00_00<br>00_00_01<br>00_00_02<br>00_00_03 | 00_00_01 | The same as the input bit-stream |
| Flag Signal | 00_00_80 | 00_00_7f | 00_00_00 |

METHOD AND APPARATUS FOR PROCESSING AUDIO/VIDEO BIT-STREAM

BACKGROUND OF THE INVENTION

1. Field of the Invention

The present invention relates to audio/video encoding and decoding technology, and more particularly, to a technology for detecting and processing a startcode emulation prevention pattern and startcode.

2. Description of the Prior Art

Audio/video encoding technology has gradually become one of the most important roles of the digital family. Following MPEG2, MP3, VCD, and DVD, an audio/video encoding with MPEG4-AVC format (also known as H.264) or Microsoft VC-1 format has become the basic requirements of current multimedia products, wherein these two formats are widely adopted in HD-DVD and Blue-ray Disc (BD) systems. Due to these two formats having capabilities of high compression, low bit rate, high communication integration, and do not require complex programs, they have become essential requirements within audio/video digital products.

Taking MPEG4-AVC for example, startcode patterns and startcode emulation prevention patterns are already defined in the MPEG4-AVC specification. A pattern '00_00_01' expressed hexadecimally is defined as the startcode, wherein the startcode pattern is inserted into the front end of each NAL unit to discriminate the locations between the beginning of a new NAL unit and the end of its previous NAL unit. During the encoding process, if a pattern identical to the startcode pattern appears in the bit-stream of the encoding result, an emulation prevention byte is inserted into the bit-stream to avoid startcode emulations. For example, when the pattern '00_00_01' appears in the bit-stream of the encoding result, the emulation prevention byte '03' (i.e., 0x03) expressed hexadecimally is inserted into the bit-stream to obtain a new bit-stream segment '00_00_03_01'. In addition, the four patterns '00_00_03_00', '00_00_03_01', '00_00_03_02', and '00_00_03_03', are defined as the startcode emulation prevention patterns in the MPEG4-AVC specification.

Because startcode emulation issues always appear in these two formats, a startcode emulation prevention mechanism is designed during the encoding process to distinguish the startcode emulation from the startcode. If the startcode emulation prevention pattern is not detected during the decoding process, the bit-stream can be directly decoded. If the startcode emulation prevention pattern is detected during the decoding process, the emulation prevention byte '0x03' needs to first be moved. If such an operation and the decoding operation are performed at the same time, the complexity of decoding the bit-stream is substantially increased. Thus, the efficiency of processing the bit-stream will be seriously affected especially when dealing with a bit-stream having a high bit rate.

SUMMARY OF THE INVENTION

It is therefore one of the objectives of the claimed invention to provide a method for processing an audio/video bit-stream and a related apparatus for solving the abovementioned problems by detecting a startcode, by detecting and removing a startcode emulation prevention pattern of the bit-stream, and by setting a flag signal.

According to an exemplary embodiment of the present invention, a method for processing an audio/video bit-stream is provided. The method includes the steps of receiving an input bit-stream; detecting whether the input bit-stream has a startcode emulation prevention pattern; and removing the startcode emulation prevention pattern from the input bit-stream to generate an output bit-stream and setting a flag signal as a first designated flag value when the startcode emulation prevention pattern is detected. The method further includes the steps of detecting whether the input bit-stream has a startcode, and directly outputting the input bit-stream and setting the flag signal as a second designated flag value when the startcode is detected.

According to another exemplary embodiment of the present invention, a method for processing an audio/video bit-stream is provided. The method includes the steps of receiving an input bit-stream; detecting whether the input bit-stream has a startcode; and directly outputting the input bit-stream and setting the flag signal as a designated flag value when the startcode is detected. The method further includes the step of directly outputting the input bit-stream and maintaining the flag signal at a default value when the startcode is not detected.

According to another exemplary embodiment of the present invention, an audio/video bit-stream processing apparatus is provided. The audio/video bit-stream processing apparatus includes a bit-stream pre-processing module and a decoding module. The bit-stream pre-processing module includes a detecting unit, a removing unit, and a flag signal generating unit. The detecting unit is used for receiving an input bit-stream and for detecting whether the input bit-stream has a startcode emulation prevention pattern. The removing unit is coupled to the detecting unit for removing the startcode emulation prevention pattern from the input bit-stream to generate an output bit-stream when the startcode emulation prevention pattern is detected. The flag signal generating unit is coupled to the detecting unit for setting a flag signal as a first designated flag value when the startcode emulation prevention pattern is detected. The decoding module is coupled to the removing unit and the flag signal generating unit for decoding the input bit-stream according to the flag signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a table illustrating setting values of the input bit-stream, the output bit-stream, and the flag signal shown in FIG. 1.

DETAILED DESCRIPTION

In the following embodiments, an audio/video bit-stream conforming with the MPEG4-AVC format or the Microsoft VC-1 format is taken as an example for illustrating a method for processing an audio/video bit-stream and a related device as disclosed in the present invention. Those skilled in the art should understand that the applications of the present invention are not limited to this only, and the technology of the present invention is also suitable for other existing formats or other formats in the future without departing from the spirit of the present invention.

Figure 1:
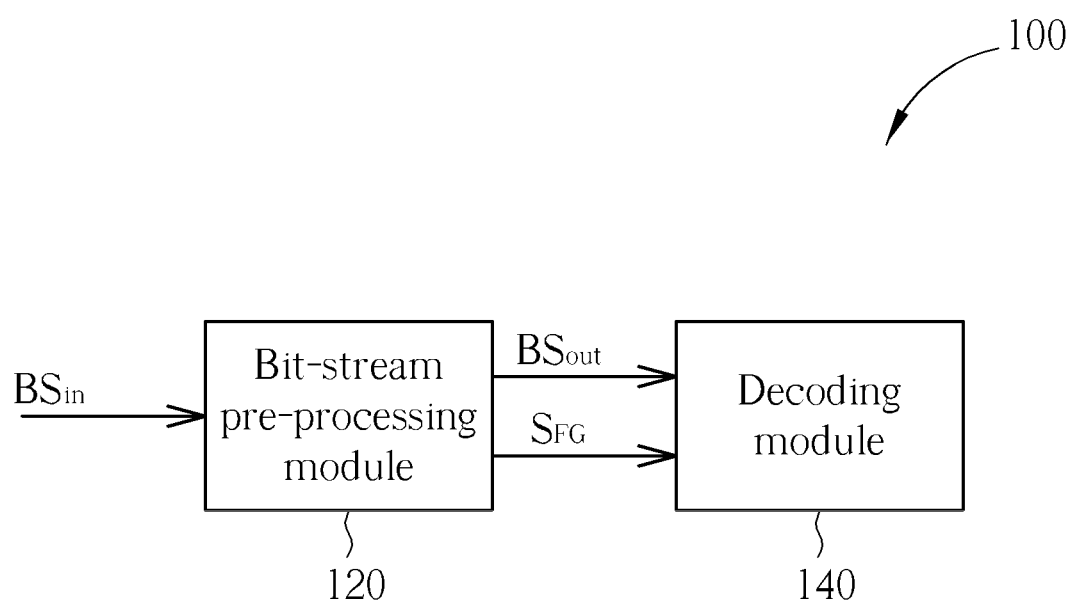
FIG. 1 is a block diagram of an audio/video bit-stream processing apparatus according to an embodiment of the present invention.

Please refer to FIG. 1. FIG. 1 is a block diagram of an audio/video bit-stream processing apparatus 100 according to an embodiment of the present invention. The bit-stream processing apparatus 100 is disposed in the decoding end of an audio/video system, which includes a bit-stream pre-processing module 120 and a decoding module 140. The bit-stream pre-processing module 120 receives an input bit-stream $BS_{in}$ (which can be an audio/video bit-stream conforming with the MPEG4-AVC format or the Microsoft VC-1 format, or other formats) and then generates an output bit-stream $BS_{out}$ and a flag signal $S_{FG}$ according to the input bit-stream $BS_{in}$. The decoding module 140 is coupled to the bit-stream pre-processing module 120 for receiving the output bit-stream $BS_{out}$ and the flag signal $S_{FG}$, so as to decode the input bit-stream $BS_{in}$ according to the flag signal $S_{FG}$. Elements and related operations of the detailed circuits of the bit-stream pre-processing module 120 and the decoding module 140 will be detailed in the following embodiments.

Figure 2:
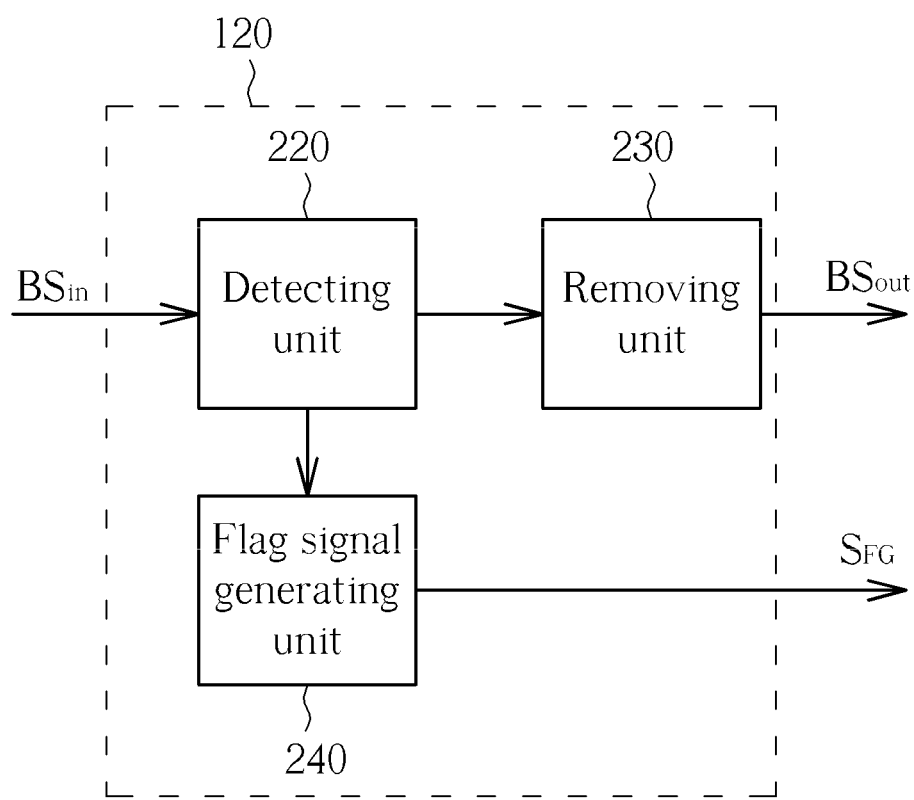
FIG. 2 is a diagram showing the detailed circuit of the bit-stream pre-processing module shown in FIG. 1 according to an embodiment of the present invention.

Please refer to FIG. 2. FIG. 2 is a diagram of the detailed circuit of the bit-stream pre-processing module 120 shown in FIG. 1 according to an embodiment of the present invention. The bit-stream pre-processing module 120 includes, but is not limited to, a detecting unit 220, a removing unit 230, and a flag signal generating unit 240. The detecting unit 220 is used for receiving the input bit-stream $BS_{in}$ and for detecting whether the input bit-stream $BS_{in}$ has a startcode emulation prevention pattern P1. The removing unit 230 is coupled to the detecting unit 220 for removing the startcode emulation prevention pattern P1 from the input bit-stream $BS_{in}$ to generate the output bit-stream $BS_{out}$ when the startcode emulation prevention pattern P1 is detected. The flag signal generating unit 240 is coupled to the detecting unit 220 for setting the flag signal $S_{FG}$ as a first designated flag value FG1 when the startcode emulation prevention pattern P1 is detected and for setting the flag signal $S_{FG}$ as a second designated flag value FG2 when a startcode is detected.

As mentioned above, the startcode patterns and startcode emulation prevention patterns are already defined in the MPEG4-AVC specification. The pattern '00_00_01' is defined as the startcode, and the four patterns '00_00_03_00', '00_00_03_01', '00_00_03_02', and '00_00_03_03', are defined as the startcode emulation prevention patterns in the MPEG-AVC specification. These patterns are applied to the following embodiments for illustrations.

Figure 3:
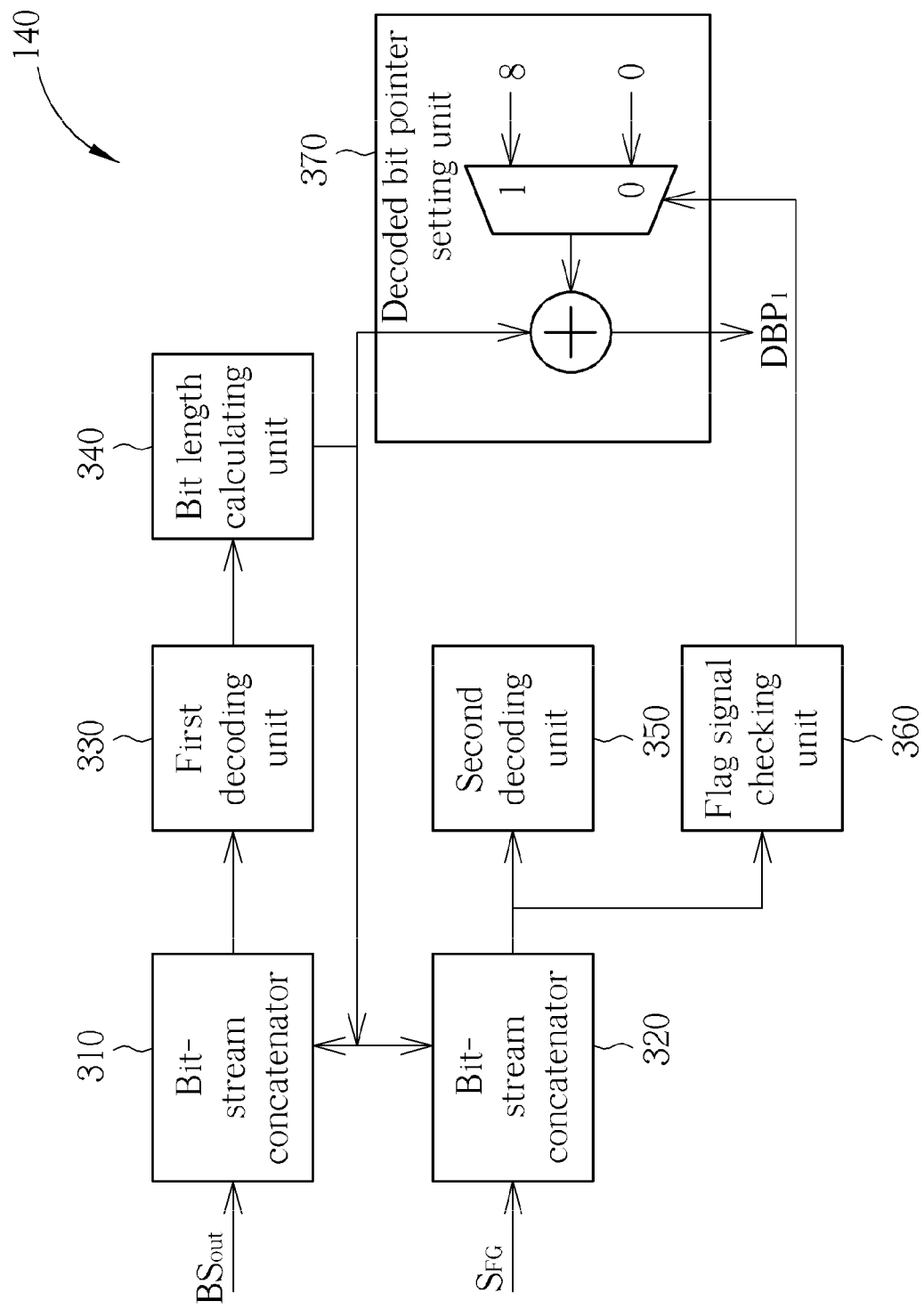
FIG. 3 is a diagram showing the detailed circuit of the decoding module shown in FIG. 1 according to an embodiment of the present invention.

Please refer to FIG. 3. FIG. 3 is a diagram of the detailed circuit of the decoding module 140 shown in FIG. 1 according to an embodiment of the present invention. The decoding module 140 includes, but is not limited to, two bit-stream concatenators 310 and 320, a first decoding unit 330, a bit length calculating unit 340, a second decoding unit 350, a flag signal checking unit 360, and a decoded bit pointer setting unit 370. The bit-stream concatenators 310 and 320 are respectively used for receiving the output bit-stream $BS_{out}$ and the flag signal $S_{FG}$ and for concatenating a plurality of bits together to obtain the needed number of bits. The first decoding unit 330 is coupled to the bit-stream concatenator 310 for performing decoding operations, conforming to standard formats (such as the H.264 format or the VC-1 format), on the information of the output bit-stream $BS_{out}$. The second decoding unit 350 is coupled to the bit-stream concatenator 320 for decoding the flag signal $S_{FG}$ to find the position of the startcode. For example, when the second decoding unit 350 decodes that the flag signal $S_{FG}$ is the second designated flag value FG2, it notifies the first decoding unit 330 that the startcode exists. In addition, the bit length calculating unit 340 is coupled to the first decoding unit 330 for calculating a bit length of the output bit-stream $BS_{out}$ that has been decoded and passes this bit length to the bit-stream concatenators 310 and 320 to notify them which bits need to be concatenated. The flag signal checking unit 360 is coupled to the second decoding unit 350 for checking the settings of the flag signal $S_{FG}$. Finally, the decoded bit pointer setting unit 370 is coupled to the bit length calculating unit 340 and to the flag signal checking unit 360 for setting a decoded bit pointer $DBP_1$ according to the bit length and the flag signal $S_{FG}$, which indicates the position of the bit has been recently decoded. For example, if the flag signal $S_{FG}$ is the first designated flag value FG1, eight bits are added to the original decoded bit pointer to set the decoded bit pointer $DBP_1$, so as to notify the decoding module 140 that the startcode emulation prevention byte '0x03' has been removed at this bit. If the flag signal $S_{FG}$ is not the first designated flag value FG1, the original decoded bit pointer is set as the decoded bit pointer $DBP_1$. This way, the decoded bit pointer $DBP_1$ can be properly obtained to benefit the following decoding operations.

The abovementioned embodiments are presented merely for describing the present invention, and in no way should be considered as a limitation of the present invention. It will be obvious to those skilled in the art that appropriate modifications on the decoding module 140 may be made without departing from the spirit of the present invention.

Figure 4:
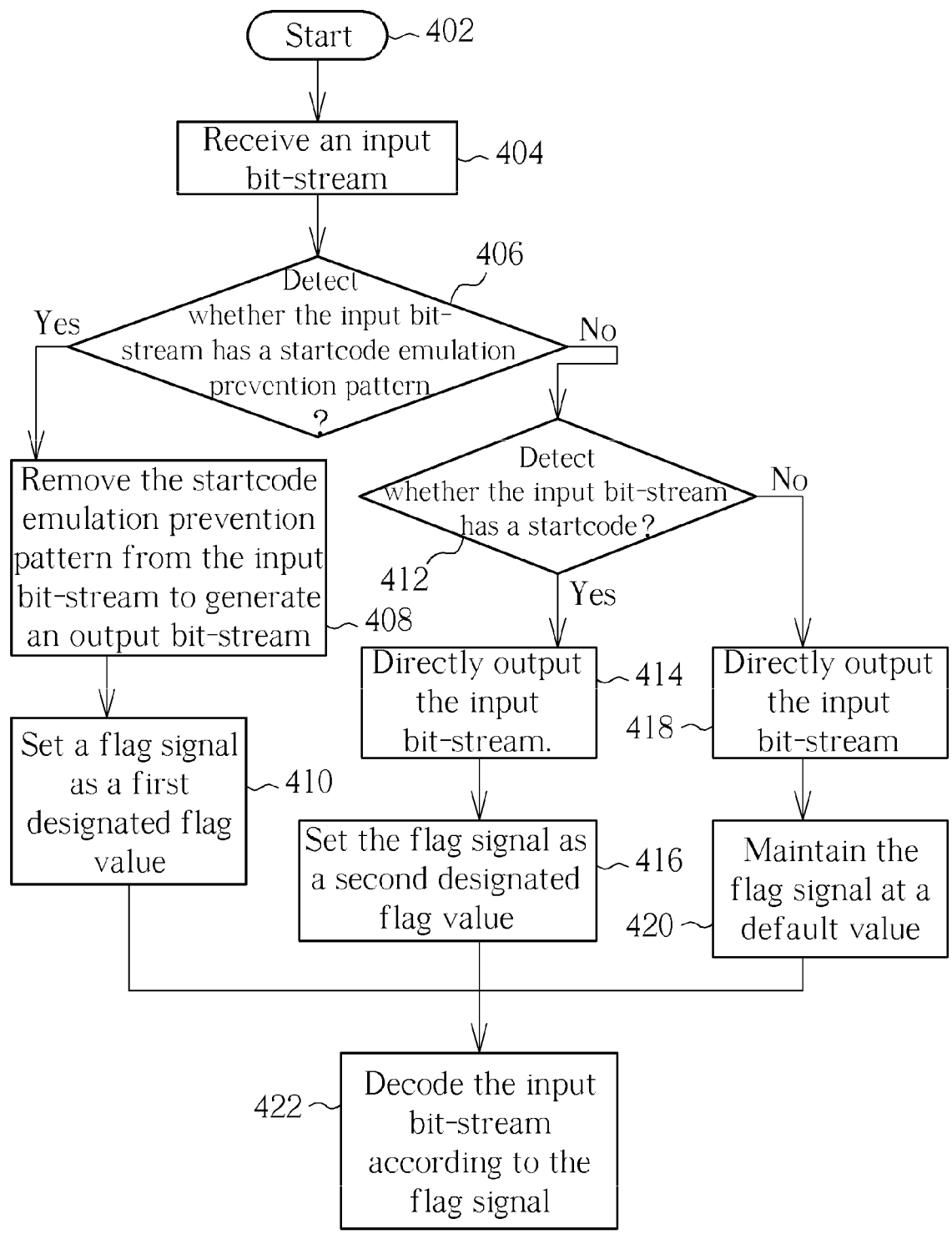
FIG. 4 is a flowchart illustrating a method for processing an audio/video bit-stream according to an exemplary embodiment of the present invention.

Please refer to FIG. 4. FIG. 4 is a flowchart illustrating a method for processing an audio/video bit-stream according to an exemplary embodiment of the present invention. Please note that the following steps are not limited to be performed according to the exact sequence shown in FIG. 4 if a roughly identical result can be obtained. The method includes, but is not limited to, the following steps:

Step 402: Start.

Step 404: Receive an input bit-stream.

Step 406: Detect whether the input bit-stream has a startcode emulation prevention pattern. When the startcode emulation prevention pattern is detected, go to Step 408; otherwise, go to Step 412.

Step 408: Remove the startcode emulation prevention pattern from the input bit-stream to generate an output bit-stream. Go to Step 410.

Step 410: Set a flag signal as a first designated flag value. Go to Step 422.

Step 412: Detect whether the input bit-stream has a startcode. When the startcode is detected, go to Step 414; otherwise, go to Step 418.

Step 414: Directly output the input bit-stream. Go to Step 416.

Step 416: Set the flag signal as a second designated flag value. Go to Step 422.

Step 418: Directly output the input bit-stream. Go to Step 420.

Step 420: Maintain the flag signal at a default value. Go to Step 422.

The following description details how each element operates by collocating the steps shown in FIG. 4 and the elements shown in FIG. 2 and FIG. 3. In the steps 404~406, the detecting unit 220 of the bit-stream pre-processing module 120 receives the input bit-stream $BS_{in}$ and detects whether the input bit-stream $BS_{in}$ has the startcode emulation prevention pattern. In the following, descriptions are divided into several conditions. In a first condition, when the startcode emulation prevention pattern is detected, the startcode emulation prevention pattern is removed to generate the output bit-stream $BS_{out}$ by the removing unit 230. At this time, the flag signal generating unit 240 sets the flag signal $S_{FG}$ as the first designated flag value FG1 (the steps 408~410). If the startcode emulation prevention pattern is not detected, the detecting unit 220 continues to detect whether the input bit-stream $BS_{in}$ has the startcode (Step 412). In a second condition, the removing unit 230 directly outputs the input bit-stream $BS_{in}$ as the output bit-stream $BS_{out}$ when the startcode is detected. At this time, the flag signal generating unit 240 sets the flag signal $S_{FG}$ as the second designated flag value FG2 (the steps 414~416). In a third condition, when neither the startcode emulation prevention pattern nor the startcode are detected, the removing unit 230 directly outputs the input bit-stream $BS_{in}$ as the output bit-stream $BS_{out}$ and the flag signal generating unit 240 maintains the flag signal $S_{FG}$ at the default value (the steps 418~420). Finally, the decoding module 140 receives the output bit-stream $BS_{out}$ and the flag signal $S_{FG}$ (obtained from the abovementioned steps 408~410, 414~416, or 418~420), and then decodes the input bit-stream $BS_{in}$ according to the flag signal $S_{FG}$ (Step 422).

Please note that the abovementioned steps are merely a practicable embodiment of the present invention, and in no way should be considered to be limitations of the scope of the present invention. The method can include other intermediate steps or several steps can be merged into a single step for suitable modifications without departing from the spirit of the present invention.

Please refer to FIG. 5. FIG. 5 is a table illustrating setting values of the input bit-stream $BS_{in}$, the output bit-stream $BS_{out}$, and the flag signal $S_{FG}$ shown in FIG. 1. As shown in FIG. 5, the following descriptions are divided into three cases. Please also refer to FIG. 2. In a first case, the input bit-stream $BS_{in}$ has the startcode emulation prevention pattern, such as '00_00_03_00', '00_00_03_01', '00_00_03_02', and '00_00_03_03'. At this time, the removing unit 230 removes the startcode emulation prevention pattern from the input bit-stream $BS_{in}$ to generate the output bit-stream $BS_{out}$, such as '00_00_00', '00_00_01', '00_00_02', and '00_00_03'. The flag signal generating unit 240 sets the flag signal $S_{FG}$ as the first designated flag value FG1, such as '00_00_80'. In a second case, the input bit-stream $BS_{in}$ does not have the startcode emulation prevention pattern but has the startcode (i.e., '00_00_01'). At this time, the removing unit 230 directly outputs the input bit-stream $BS_{in}$ as the output bit-stream $BS_{out}$ (i.e., '00_00_01') while the flag signal generating unit 240 sets the flag signal $S_{FG}$ as the second designated flag value FG2, such as '00_00_7f'. In a third case, the input bit-stream $BS_{in}$ has neither the startcode emulation prevention pattern nor the startcode. At this time, the removing unit 230 directly outputs the input bit-stream $BS_{in}$ as the output bit-stream $BS_{out}$ while the flag signal generating unit 240 maintains the flag signal $S_{FG}$ at the default value, such as '00_00_00'.

Please note that the abovementioned embodiment is merely an example for describing the present invention, and in no way should be considered to be limitations of the scope of the present invention. It will be obvious to those skilled in the art that various modifications on the settings of the flag signal $S_{FG}$ may be made without departing from the spirit of the present invention.

The abovementioned embodiments are presented merely for describing the present invention, and in no way should be considered to be limitations of the scope of the present invention. In summary, the present invention provides a method for processing an audio/video bit-stream and a related apparatus.

Before performing the decoding operations, the input bit-stream needs to be pre-processed. By detecting whether the input bit-stream has the startcode emulation prevention pattern or the startcode, different output bit-streams are generated and different settings of the flag signal are set. After that, the decoding operations are performed according to the different settings of the flag signal. Therefore, not only can the complexity for decoding the bit-stream be substantially reduced but also the startcode emulation prevention pattern can be easily removed to distinguish the startcode emulation prevention pattern from the startcode. In addition, through the bit length of the output bit-stream $BS_{out}$ and the settings of the flag signal $S_{FG}$, the decoded bit pointer $DBP_1$ can be properly obtained to benefit the following decoding operations.

Those skilled in the art will readily observe that numerous modifications and alterations of the device and method may be made while retaining the teachings of the invention.

What is claimed is:

1. A method for processing an audio/video bit-stream, comprising:
   receiving an input bit-stream;
   detecting whether the input bit-stream has a startcode emulation prevention pattern;
   when the startcode emulation prevention pattern is detected, removing the startcode emulation prevention pattern from the input bit-stream to generate an output bit-stream;
   calculating a bit length of the output bit stream;
   when the startcode emulation prevention pattern is detected, setting a flag signal as a first designated flag value and setting a decoded bit pointer by adding a predetermined value to a bit number corresponding to the bit length, wherein the predetermined value comprises a first value if the flag signal is set to the first designated flag value.

2. The method of claim 1, further comprising:
   detecting whether the input bit-stream has a startcode; and
   when the startcode is detected, directly outputting the input bit-stream and setting the flag signal as a second designated flag value.

3. The method of claim 2, further comprising:
   when the startcode is not detected, directly outputting the input bit-stream and maintaining the flag signal at a default value.

4. The method of claim 3, further comprising:
   setting the decoded bit pointer according to the bit length and the flag signal.

5. The method of claim 3, further comprising:
   decoding the input bit-stream according to the flag signal.

6. An audio/video bit-stream processing apparatus, comprising:
   a bit-stream pre-processing module, comprising:
      a detecting unit, used for receiving an input bit-stream and for detecting whether the input bit-stream has a startcode emulation prevention pattern;
      a removing unit, coupled to the detecting unit, for removing the startcode emulation prevention pattern from the input bit-stream to generate an output bit-stream when the startcode emulation prevention pattern is detected; and
      a flag signal generating unit, coupled to the detecting unit, for setting a flag signal as a first designated flag value when the startcode emulation prevention pattern is detected; and
   a decoding module, coupled to the removing unit and the flag signal generating unit, for decoding the input bit-stream according to the flag signal, comprising:

a bit length calculating unit, coupled to the removing unit, for calculating a bit length of the output bit-stream; and a decoded bit pointer setting unit, coupled to the bit length calculating unit, for setting a decoded bit pointer according to the bit length and the flag signal, wherein the decoded bit pointer setting unit sets a decoded bit pointer by adding a predetermined value to a bit number corresponding to the bit length, wherein the predetermined value comprises a first value if the flag signal is set to the first designated flag value.

7. The audio/video bit-stream processing apparatus of claim 6, wherein the detecting unit is further used for:

detecting whether the input bit-stream has a startcode; and directly outputting the input bit-stream when the startcode is detected;

and the flag signal generating unit is further used for:

setting the flag signal as a second designated flag value when the startcode is detected.

8. The audio/video bit-stream processing apparatus of claim 7, wherein the detecting unit is further used for directly outputting the input bit-stream when the startcode is not detected; and the flag signal generating unit is further used for maintaining the flag signal at a default value when the startcode is not detected.

9. The audio/video bit-stream processing apparatus of claim 7, wherein the decoding module further comprises:

a flag signal checking unit, coupled to the flag signal generating unit, for checking the flag signal.

10. A method for processing an audio/video bit-stream, comprising:

receiving an input bit-stream;

detecting whether the input bit-stream includes a startcode emulation prevention pattern;

in response to detecting the startcode emulation prevention pattern:

removing the startcode emulation prevention pattern from the input bit-stream to generate an output bit-stream; and setting a flag signal as a first designated flag value; and setting a decoded bit pointer by adding a predetermined value to a bit number corresponding to a bit length, wherein the predetermined value added to the decoded bit pointer is based on the flag signal, wherein the predetermined value comprises a first value if the flag signal is set to the first designated flag value.

11. The method of claim 10, wherein the predetermined value comprises a second value if the flag signal is set to a value other than the first designated flag value.

12. The method of claim 10, further comprising:

detecting whether the input bit-stream includes a startcode; and in response to detecting the startcode, directly outputting the input bit-stream.

13. The method of claim 12, wherein detecting whether the input bit-stream includes the startcode is performed in response to the startcode emulation prevention pattern not being detected.

14. The method of claim 12, further comprising in response to detecting the startcode, setting the flag signal as a second designated flag value.

15. The method of claim 12, further comprising in response to not detecting the startcode, directly outputting the input bit-stream and maintaining the flag signal at a default value.

16. The method of claim 10, further comprising decoding the input bit-stream according to the decoded bit pointer.

* * * * *